US009063769B2

United States Patent
Damola et al.

(10) Patent No.: US 9,063,769 B2
(45) Date of Patent: Jun. 23, 2015

(54) NETWORK PERFORMANCE MONITOR FOR VIRTUAL MACHINES

(75) Inventors: Ayodele Damola, Solna (SE); Andreas Johnsson, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 431 days.

(21) Appl. No.: 13/575,643

(22) PCT Filed: Feb. 4, 2010

(86) PCT No.: PCT/SE2010/050132
§ 371 (c)(1),
(2), (4) Date: Jul. 27, 2012

(87) PCT Pub. No.: WO2011/096859
PCT Pub. Date: Aug. 11, 2011

(65) Prior Publication Data
US 2012/0304175 A1    Nov. 29, 2012

(51) Int. Cl.
*G06F 9/455* (2006.01)
*G06F 11/34* (2006.01)

(52) U.S. Cl.
CPC ........ *G06F 9/45558* (2013.01); *G06F 11/3419* (2013.01); *G06F 11/3433* (2013.01); *G06F 11/3466* (2013.01); *G06F 11/349* (2013.01); *G06F 2009/45591* (2013.01); *G06F 2201/815* (2013.01)

(58) Field of Classification Search
None
See application file for complete search history.

(56) References Cited

U.S. PATENT DOCUMENTS

| 6,317,775 | B1 * | 11/2001 | Coile et al. ................... 709/201 |
| 8,189,487 | B1 * | 5/2012 | Mateski et al. ............... 370/242 |
| 8,219,676 | B2 * | 7/2012 | Jagadish et al. ............... 709/224 |
| 8,644,352 | B1 * | 2/2014 | Hutchison et al. ............ 370/509 |
| 2005/0132044 | A1 * | 6/2005 | Guingo et al. ................. 709/225 |
| 2006/0069938 | A1 * | 3/2006 | Olszewski et al. ............ 713/340 |
| 2006/0271827 | A1 * | 11/2006 | Cascaval et al. ................ 714/39 |
| 2008/0066073 | A1 * | 3/2008 | Sen ............................... 718/105 |
| 2008/0114806 | A1 * | 5/2008 | Kosche ....................... 707/104.1 |
| 2008/0155537 | A1 * | 6/2008 | Dinda et al. ....................... 718/1 |
| 2008/0177756 | A1 * | 7/2008 | Kosche et al. ................ 707/100 |
| 2008/0263288 | A1 * | 10/2008 | Austen et al. ................. 711/153 |
| 2008/0263309 | A1 * | 10/2008 | Attinella ....................... 711/173 |
| 2009/0248611 | A1 * | 10/2009 | Xu et al. ........................... 707/1 |

(Continued)

OTHER PUBLICATIONS

Danhua Guo; Guangdeng Liao; Bhuyan, L.N. ; "Performance characterization and cache-aware core scheduling in a virtualized multi-core server under 10GbE," Workload Characterization, 2009. IISWC 2009. IEEE International Symposium on, Oct. 4-6, 2009.
Govindan, S, et al.,: "Xen and Co.: Communication-Aware CPU Management in Consolidated Xen-Based Hosting Platforms," Computers, IEEE Transactions on, vol. 58. No. 8, Aug. 2009.

(Continued)

*Primary Examiner* — Greg C Bengzon

(57) ABSTRACT

Embodiments of the present invention relate to a method and system to monitor network performance in a computer including at least one physical server having a hardware machine attached via a hypervisor to a set of virtual machines. According to an embodiment of the present invention, the system measures network performance parameters for selected packet flows in transition between the hardware machine and the virtual machines, analyzes the measured performance parameters, and identifies a source of network degradation.

19 Claims, 7 Drawing Sheets

(56) References Cited

U.S. PATENT DOCUMENTS

| | | | | |
|---|---|---|---|---|
| 2010/0077395 | A1* | 3/2010 | Edwards et al. | 718/1 |
| 2010/0094990 | A1* | 4/2010 | Ben-Yehuda et al. | 709/224 |
| 2010/0223397 | A1* | 9/2010 | Elzur | 709/235 |
| 2010/0235836 | A1* | 9/2010 | Bratanov | 718/1 |
| 2010/0250230 | A1* | 9/2010 | Ganguly et al. | 703/26 |
| 2010/0260204 | A1* | 10/2010 | Pepper et al. | 370/474 |
| 2010/0322089 | A1* | 12/2010 | Raja et al. | 370/252 |
| 2010/0322237 | A1* | 12/2010 | Raja et al. | 370/389 |
| 2010/0325257 | A1* | 12/2010 | Goel et al. | 709/223 |
| 2010/0325371 | A1* | 12/2010 | Jagadish et al. | 711/150 |
| 2011/0072431 | A1* | 3/2011 | Cable et al. | 718/1 |
| 2011/0113136 | A1* | 5/2011 | Phaal | 709/224 |
| 2011/0134761 | A1* | 6/2011 | Smith et al. | 370/252 |
| 2011/0264790 | A1* | 10/2011 | Haeuptle et al. | 709/224 |
| 2011/0273995 | A1* | 11/2011 | Ahn et al. | 370/241 |
| 2012/0079108 | A1* | 3/2012 | Findeisen | 709/224 |
| 2012/0128011 | A1* | 5/2012 | Holmeide et al. | 370/474 |

OTHER PUBLICATIONS

Xiantao Zhang, et al.: "Optimizing Xen VMM Based on Intel Virtualization Technology," Internet Computing in Science and Engineering, 2008. ICICSE '08. International Conference on, Jan. 28-29, 2008.

Haider, et al.: "Challenges in resource Allocation in Network Virtualization". $20^{th}$ ITC Specialist Seminar. May 2009. Hoi An, Vietnam.

Amazon EC2, Amazon Elastic Compute Cloud (EC2)—Scalable Cloud Hosting. http://aws.amazon.com/ec2/.

VMware: "Timekeeping in VMware Virtual Machines". 2008.

Harzog, Bernd: "Managing Virtualized Systems—Pinpointing performance problems in the virtual infrastructure." Apr. 2008.

VMware VMotion: "Live Migration for Virtual Machines Without Service Interruption". http://www.vmare.com/pdf/vmotion_datasheet.pdf.

Fakhfakh, et al.: "High Availability in IMS Virtualized Network". Nov. 2009.

\* cited by examiner

NETWORK PERFORMANCE MONITOR FOR VIRTUAL MACHINES

CLAIM OF PRIORITY

This application is a 371 of International Application No. PCT/SE10/50132, filed Feb. 4, 2010. The disclosure of this document is hereby incorporated herein by reference.

TECHNICAL FIELD

The present invention generally relates to methods, systems and nodes to monitor network performance in a computer.

BACKGROUND

Virtualization of networks and computers is a reality today. One prominent example for computer virtualization, which can be utilized by more or less anyone, is the Amazon Elastic Compute Cloud (Amazon EC2). It is a web service that provides dynamic computer capacity to their customers. Also, computer virtualization is common in data centres where resources can be shared in order to increase utilization of hardware. Developed prototypes running in virtualized environments have been described in the document "Managing Virtualized Systems—Pinpointing performance problems in the virtual infrastructure, Bernd Harzog, April 2008". Several virtualization implementations exist including VMWare, see "http://www.vmware.com/", Sun VirtualBox, see "http://www.virtualbox.com" and XEN, see "http://xen.org/" [2010-01-14].

FIG. 1 belongs to the prior art and discloses a simple example of a virtualized computer. Instead of running one operating system on top of the hardware, a hypervisor 2 runs as a middleware between the operating systems 5 and the hardware 3. The hypervisor acts as a hardware controller that manages the shared hardware recourses among the virtual machines (in which operating systems can run). Application 4, such as for example a web server, represent server software that can be run by a virtual machine. The main intent of the hypervisor is to instantiate the virtual machines, provision the resources and make sure that the resources are shared in a manner decided by an operator, among the executing operating systems. The operating systems depicted in FIG. 1 can be anything ranging from ordinary servers (e.g. Linux running an Apache web server) to software-based routers and switches. This provides a very flexible platform for performing various tasks.

One fundamental problem with respect to virtualization of networks and computers is how to manage the shared resources as well as how to handle dynamic changes in the provisioning, see "Challenges in Resource Allocation in Network Virtualization, Aun Haider and Richard Potter, in 20$^{th}$ ITC Specialist Seminar, May 2009, Vietnam". Another important issue to address is performance management. For example, performance management tools that are used today do not work satisfactory in a virtualized environment. It is elaborated on this issue in "Timekeeping in VMware Virtual Machines, VMware Inc., 2008" and "Managing Virtualized Systems—Pinpointing performance problems in the virtual infrastructure, Bernd Harzog, April 2008".

Network communication between a virtual machine on top of a hypervisor and an outside client can of course experience congestion. In the virtualized world the congestion or in other words, the observed network performance degradation, can originate from either real congestion on the physical network outside the physical computer or due to poor resource allocation and sharing of the common resources within the physical computer.

SUMMARY

An object of the invention is to overcome above identified limitations of the prior art when it comes to poor resource allocation and sharing of the common resources. A simple and non-intrusive mechanism assisting the resource allocation and performance monitoring tools is hereby required.

The basic concept of the invention is an apparatus for measuring performance parameters such as for example packet delay and jitter between two measurements points within a physical entity. By using the invention, it is possible to determine where the source of performance degradation resides. The technique can be used e.g. as an indicator for migration of a virtual machine to another host—with spare resources.

According to one exemplary embodiment of the invention, there is a method to monitor network performance in a computer that comprises at least one physical server having a hardware machine attached via a hypervisor to a set of virtual machines. The method includes measuring network performance parameters for selected packet flows in transition between the hardware machine and the virtual machines. The measured performance parameters are analyzed and a source of network degradation is identified.

According to another exemplary embodiment, there is a performance monitor arrangement for monitoring network performance. The arrangement comprises a Flow allocator to select network flows to monitor and interface means to receive measured performance parameters related to a hardware machine and virtual machines. The performance monitor arrangement further comprises an Analyzer to analyze the measured performance parameters and to identify a source of network degradation.

According to yet another exemplary embodiment, there is a Physical server arrangement for monitoring network performance. The arrangement comprises a performance monitor and a hardware machine attached to a set of virtual machines. The physical arrangement further comprises means in the performance monitor to measure network performance parameters for selected packet flows in transition between the hardware machine and the virtual machines, means to analyze the measured performance parameters and means to identify a source of network degradation.

An object of the invention is to avoid poor resource allocation and sharing of the common resources. This object and others are achieved by methods, arrangements, nodes, systems and articles of manufacture.

Some examples of advantages of the invention are as follows:
  The invention provides an apparatus that monitors e.g. jitter and delay in virtualized environments.
  Using the invention it is possible to find out whether network degradation, in terms of e.g. delay and jitter, is due to network congestion or due to a hypervisor that distributes and allocates resources to Virtual Machines.
  The invention provides a way to detect when a physical server is in need of load balancing.
  This invention proposes a mechanism of load balancing a physical node running several Virtual Machines by VM migration triggered when an overload is detected based on observed delay within the physical node.

The invention provides a way of load balancing Virtual Machines across physical servers in a computer depending on network performance parameters.

The invention will now be described more in detail with the aid of preferred embodiments in connection with the enclosed drawings.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
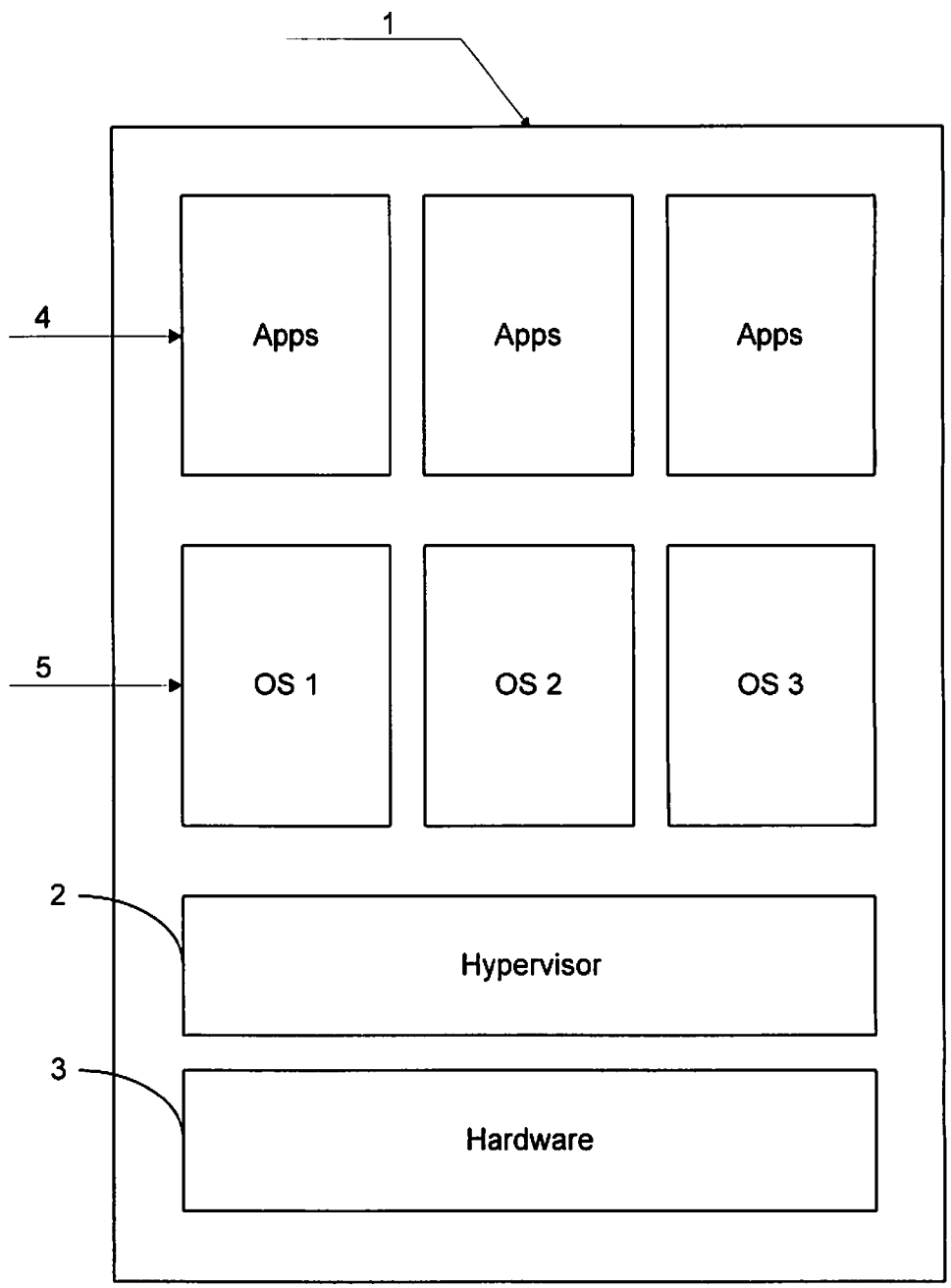
FIG. 1 is part of the prior art and discloses a block schematic illustration of a virtualized computer.
Figure 2:
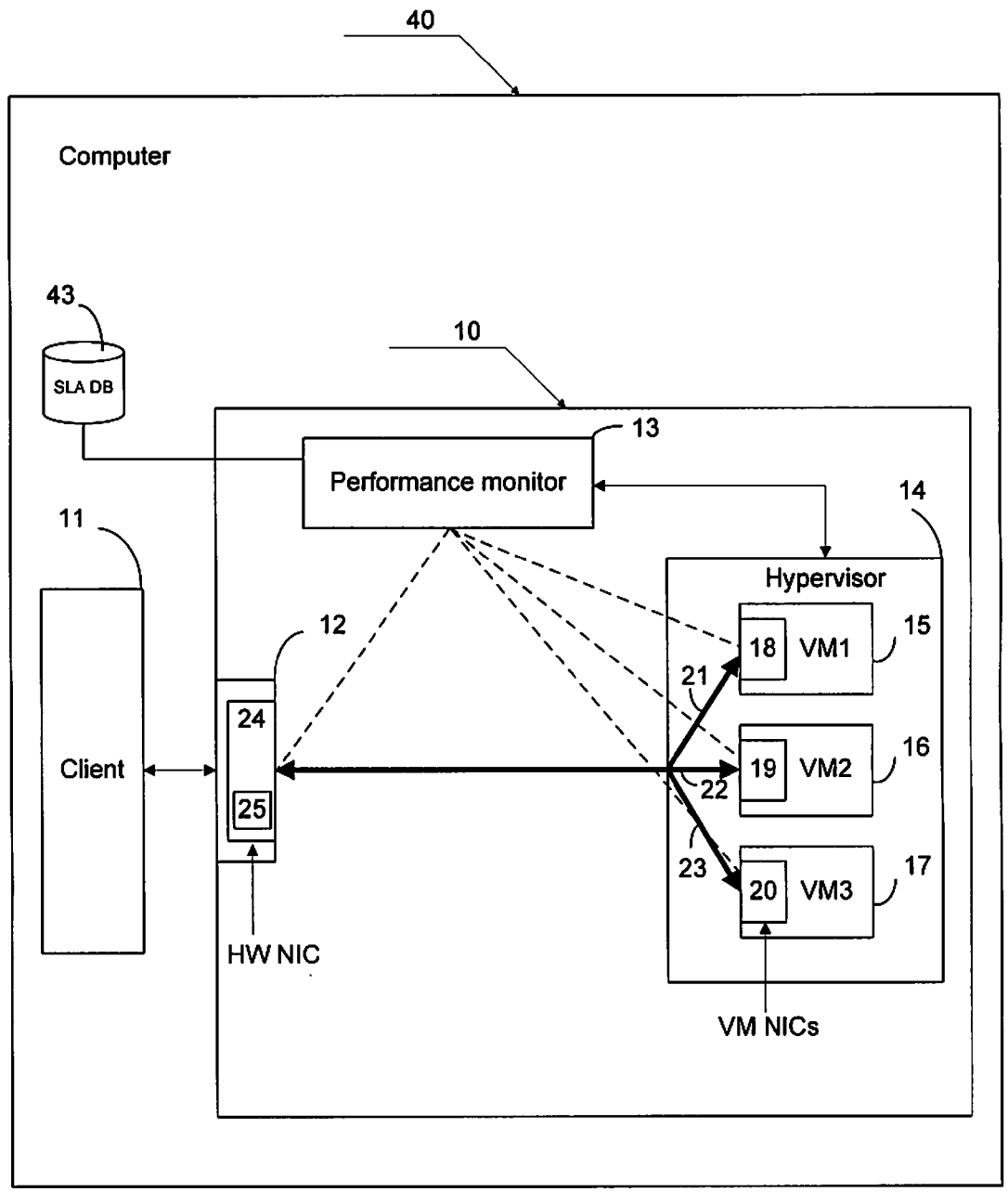
FIG. 2 is a block schematic illustration of a computer having a physical server that comprises a performance monitor and a hardware machine that is attached via a hypervisor to a set of virtual machines.

FIG. 2 is a block schematic illustration of a computer 40 comprising a physical server 10 having a performance monitor 13, and a hardware machine 12 attached via a hypervisor 14 to a set of virtual machines (VM1, VM2, VM3) 15,16,17. The hardware machine comprises a Hardware Network Interface Card (HW NIC) 24 and the virtual machines each one comprises a Virtual Machine Network Interface Card (VM NIC) 18,19,20. A hardware clock 25 is in this example located at the HW NIC. A client 11 is attached to the HW NIC and a Service Level Agreement Data Base SLA DB 43 is attached to the performance monitor 13. Packet flows 21,22,23 are illustrated in the figure.

The functionality and requirements for each component is described below. In FIG. 2 interaction between different components is illustrated by dashed lines.

Performance monitor. The performance monitor 13 is responsible for selecting network flows to monitor, signalling monitoring requests to various measurement points, collecting measurement data and for estimating e.g. packet delay and jitter. The performance monitor components will be shown more in detail later in the description together with FIG. 3.

Service Level Agreement SLA parameters. The SLA module SLA DB 43 contains predefined SLA parameters for jitter, delay etc.

HW NIC. The hardware NIC 24 must be able to time stamp in- and outgoing packets at line speed. It must also be able to accept requests on which packets to time stamp from the performance monitor as well as signal back measurement results. The time stamps should preferably be made using the physical hardware clock 25. (NICs are capable of this type of operations.) To be noted is that this is an example and the location of the hardware clock is an implementation issue.

VM NIC. The hypervisor must be able to time stamp in- and outgoing packets at the virtual NICs 18,19,20 at line speed. A VM NIC must also be able to accept requests on which packets to time stamp from the performance monitor as well as signal back measurement results. The time stamp should preferably be made using the physical HW clock 25.

Hypervisor. The hypervisor 14 is software capable of running different virtual machines at the same time. Each virtual machine can run an operating system or server software. In order to utilize measurement results produced by the performance monitor 13, an interface between the hypervisor and the performance monitor must be in place. This is an implementation issue.

VM. A virtual machine 15,16,17 is a slot in the hypervisor 14 that can run any server software. For example, the VM could be a web server providing certain functionality to a set of users.

Client. The client 11 is a network server or other element that communicates via the hardware machine 12 with a virtual machine in the hypervisor.

Figure 3:
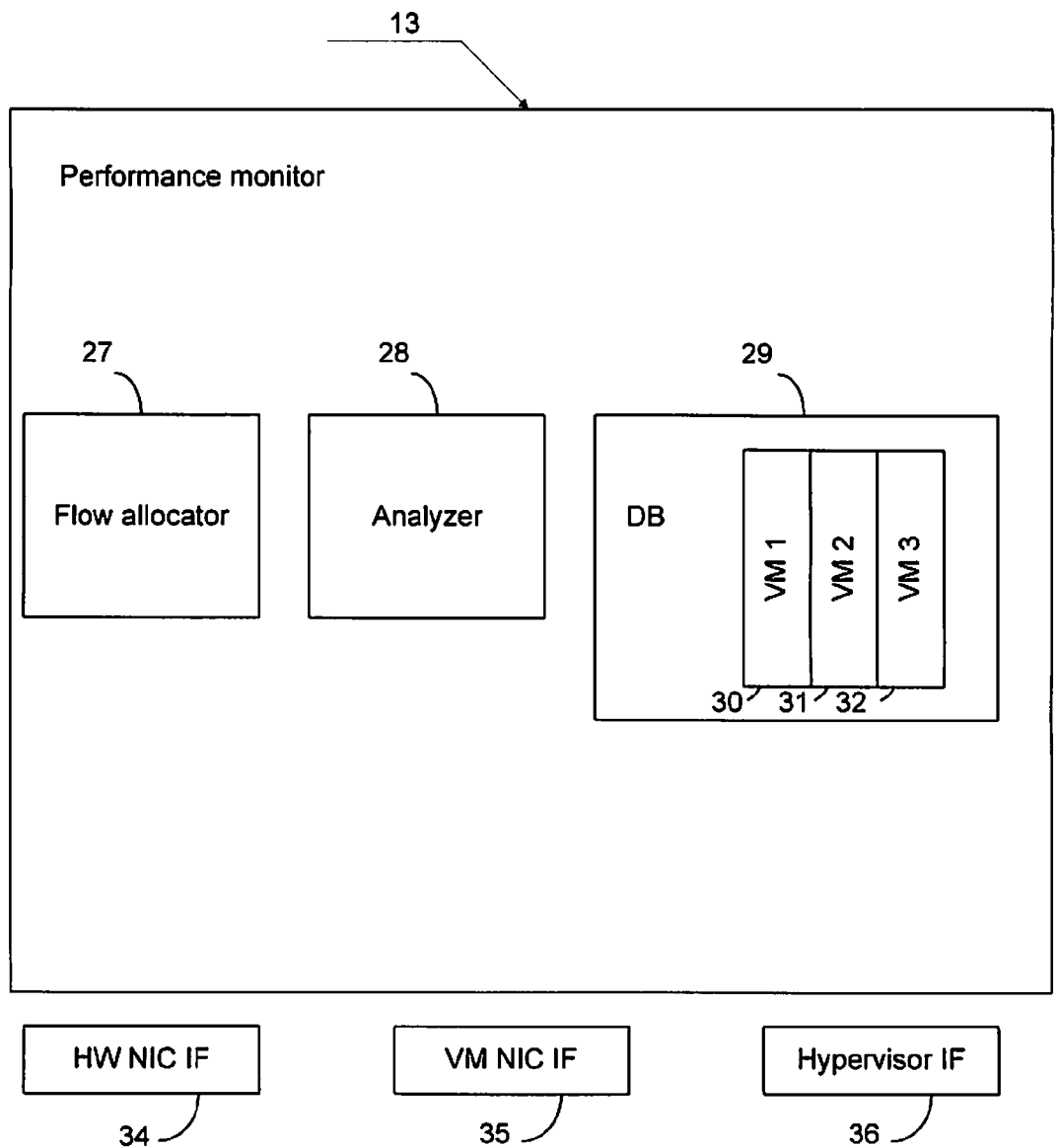
FIG. 3 is a block schematic illustration of a performance monitor located within the same machine as the hypervisor.

FIG. 3 discloses the Performance monitor 13 arrangement more in detail. The Performance monitor could be either a standalone node or constitute separate entities within the physical server 10, which operates in collaboration with the hypervisor 14. A Flow allocator 27 makes choices based on information in a DB 29 (e.g. source/destination IP, SLA parameters) on which traffic to monitor. The DB comprises storages 30-32 with information of active Virtual Machines. An Analyzer 28 estimates e.g. jitter and delay for the selected flows. The Flow allocator 27, the Analyzer 28 and the DB 29 will be further clarified in the description of a method according to the invention. The performance monitor 13 have interfaces (HW NIC IF, VM NIC IF, Hypervisor IF) 34,35,36 towards the Hardware NIC, the virtual machine NICs as well as to the hypervisor.

Figure 4:
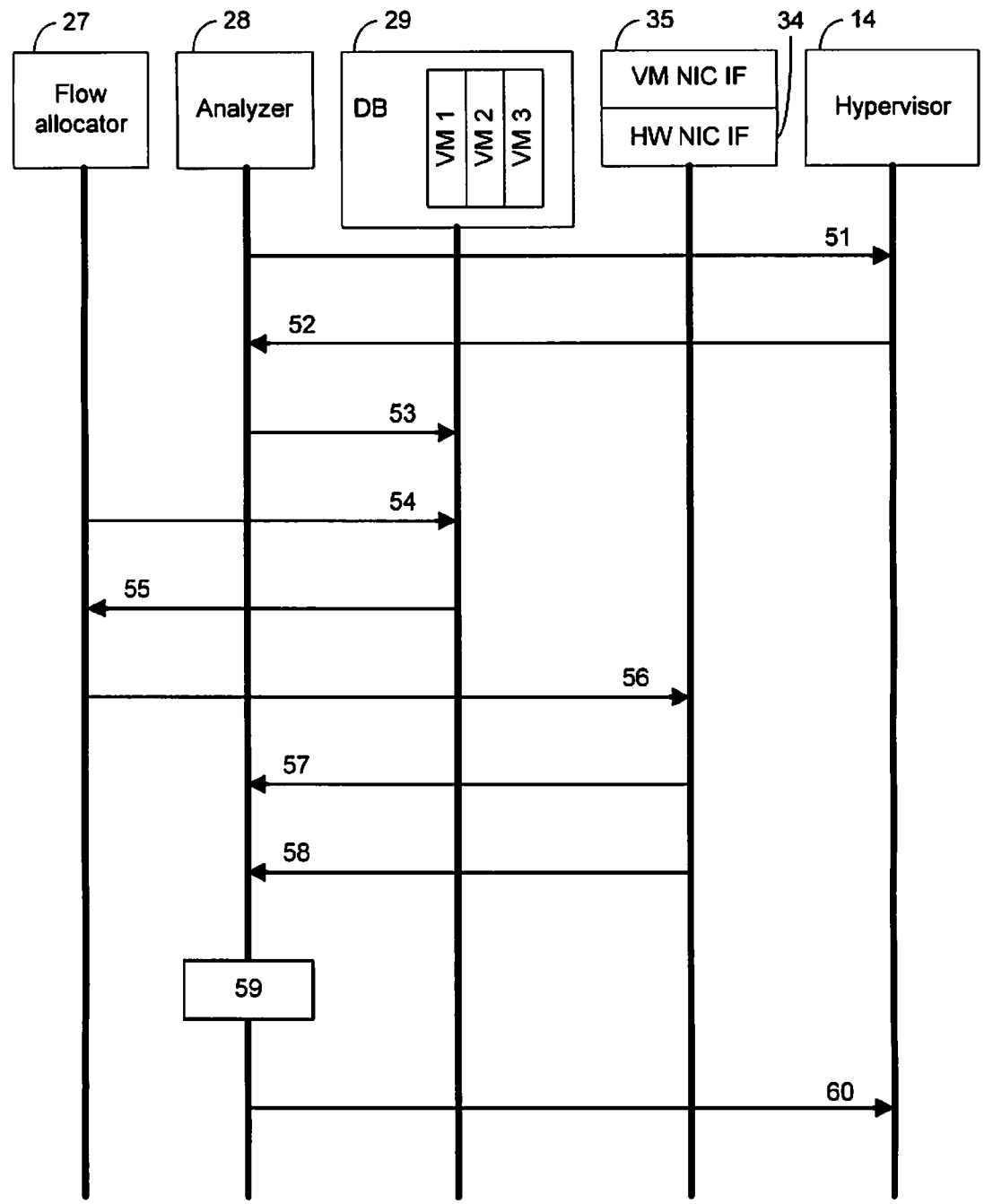
FIG. 4 discloses a signal sequence diagram representing a method to monitor network performance.

FIG. 4 discloses the measurement process according to the invention. FIG. 4 is a signal sequence diagram wherein the signalling points, i.e. the Flow allocator 27, the Analyzer 28, the data base 29, the HW- and VM NIC IFs 34 and 35, and the Hypervisor 14 that were explained earlier together with FIGS. 2 and 3, have been disclosed. The method will show the process for setting up monitoring and estimating delay and jitter. The method comprises the following steps:

The Analyzer requests 51 information of a set of active Virtual Machines VMs from the Hypervisor 14, through the Hypervisor IF.

Information about the set of active VMs is received 52 from the Hypervisor. In this example VM1-VM3 are all active. The received information contains for example:
IP addresses
Open ports
SLA parameters.
Other VM specific data The Analyzer inserts 53 identifications of active VMs (VM1, VM2 and VM3 in this example) and the received information, in the data base DB 29.

The Flow allocator requests 54 the information of active VMs from the data base 29 to select flows to monitor. A flow can be defined e.g. by source/destination IP and source/destination TCP/UDP port The Information about active VMs is received 55 from the data base to the Flow allocator. The Flow allocator selects which flows related to the VMs to monitor. Flows could for example be randomly selected. Other selection criteria could be based on critical application data such as voice or streaming video packets.

According to the invention, the Flow allocator signals 56 via the interfaces 34 and 35 to the HW NIC 24 and to the VM NICs 18-20 acting as endpoints for selected flows, which packets (that constitutes a flow) to time stamp. The NIC addressing can be based on source/destination IP, UDP/TCP port numbers etc. Each HW and VM NIC hereby time stamps all packets, in- and outgoing, that are part of the selected network flow. In this example the same hardware clock is used for the time stamping.

Time stamps for packets leaving the HW NIC are so called first time stamps TS1. All first time stamps are reported 57 from HW NIC to the analyzer.

When a packet that has been time stamped at the HW NIC arrives to the VM NIC, the VM NIC will report this arrival to the hypervisor that in turn will report to the hardware clock and the packet will be time stamped by using the hardware clock. This time stamp is a so called second time stamp TS2. In this exemplified embodiment, all time stamping is done using the same hardware clock 25. When a packet arrives to the physical server 10 i.e. to the HW NIC as well as when a virtual machine reads the packet from its VM NIC, the Hypervisor will instruct the hardware clock 25 to record the time. The operating system does not have to be involved. This is an implementation issue in the hypervisor. All second time stamps are reported 58 to the analyzer. The interaction during time stamping between the NICs and the Hypervisor has not been disclosed in FIG. 4.

Delay and jitter for the packets transmitted from the HW NIC to the VM NIC is estimated 59 in the analyzer 28. By observing network traffic between a set of virtual machines and outside clients at two different measurement points within the physical server, the delay and jitter between these two can be estimated.

Measuring of delay can be done according to the following algorithm:
Packets arrive at HW NIC.
Time stamp using HW clock (TS1).
Packet put in VM NIC queue.
Packet read from VM NIC by the operating system running on top of the virtual machine.
Time stamp using HW clock (TS2).
Delay=TS2-TS1.
Delay is compared to a baseline (or SLA) set for a specific HW NIC-VM NIC path.
Trend analysis on delay to determine whether the Hypervisor adds to network performance degradation, increasing delay means lack of resources allocated to a Virtual Machine VM running in the Hypervisor. Thus, if an application in the VM experience network degradation at the same time as the analysis show increasing trend the Hypervisor is probably overloaded which causes overall network degradation to the VM. I.e. if packet delay measured as the time for a packet to travel from the HW NIC to the VM NIC is increasing, or is above a predefined base line (e.g. an SLA parameter or according to application requirements), the additional delay originates from the hypervisor rather than from the network. This is valuable information when optimizing.

The process of measuring jitter is made in the same manner as measuring delay. That is, the packets are time stamped using the same hardware clock at the HW NIC and at the VM NIC. Estimation of jitter requires time stamps of consecutive packets. From this the inter-packet separation can be calculated, which is the basis for jitter calculation. This is done at both the HW NIC and the VM NICs. Measurement results are stored in a similar fashion as described above for delay.

The estimated jitter on the HW NIC is compared to the VM NIC. If larger on the VM NIC, jitter has been introduced by the hypervisor. A comparison to Service level Agreement SLA if acceptable can be done. If the jitter measured when the packets arrive at the VM NIC is larger than when measured on the HW NIC, the jitter originates from the virtualized environment. That is, not from the network.

Figure 5:
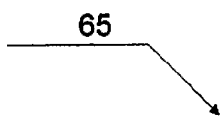
FIG. 5 discloses a flowchart illustrating a matrix wherein measured delay values or loss rates are stored.

Signal information is sent 60 to the hypervisor that can use the information for:
SLA monitoring
Make a decision to migrate a VM FIG. 5 discloses a matrix 65 wherein measured delay values X, i.e. TS2-TS1 (mentioned above), are stored. The matrix is in this example part of the data base 29. The rows represent measurements at time T for each Virtual Machine VM1-VMk. Delay average values A for the different times T are calculated and stored in the matrix.

Figure 6:
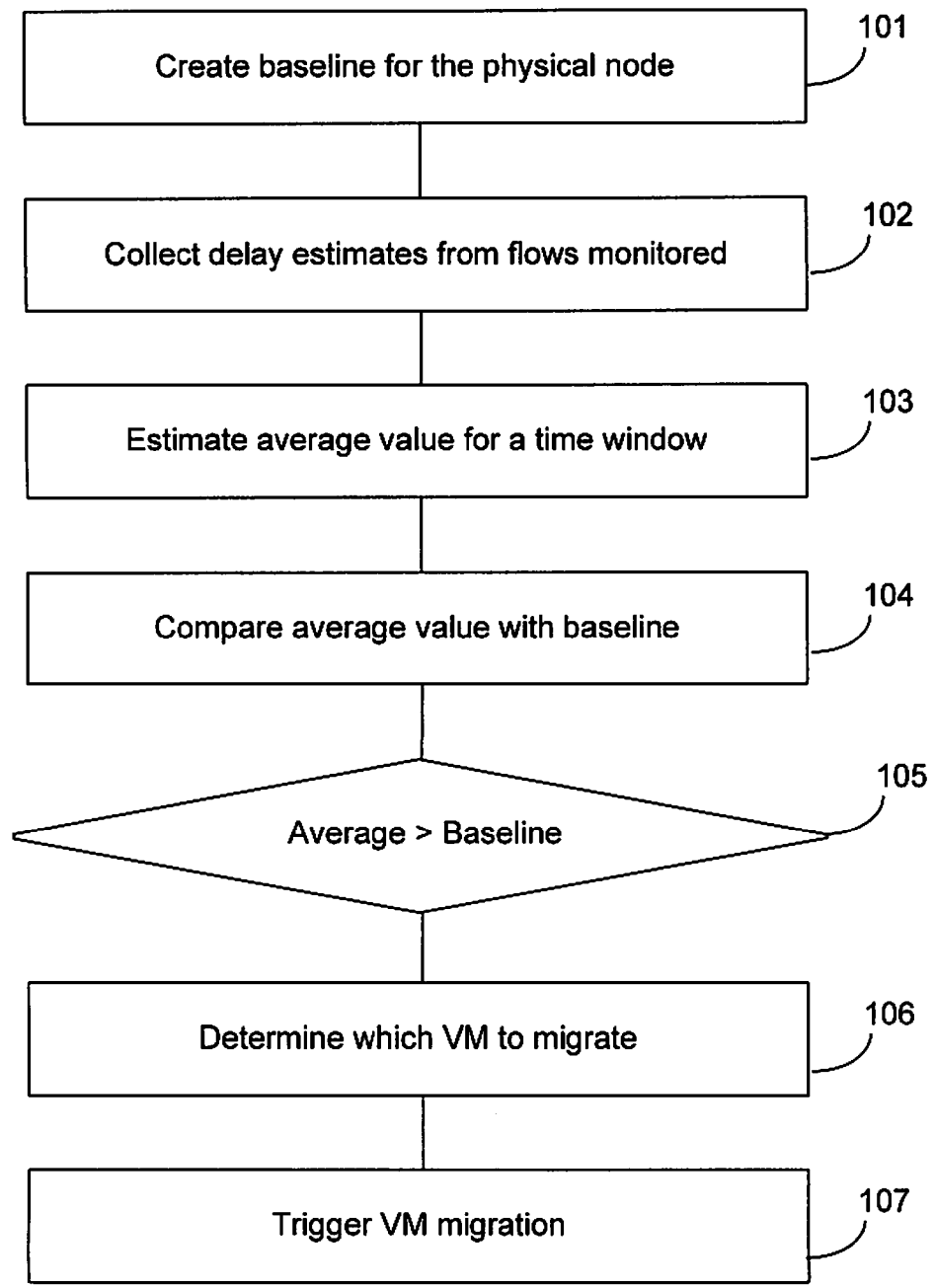
FIG. 6 discloses a flowchart illustrating a migration decision algorithm.

FIG. 6 discloses a flowchart illustrating a process of determining when migration of a VM from a physical host shall be done. The process comprises the following steps:

A baseline for delay is estimated pre-service and is estimated as an average of the delay between the HW NIC and each VM NIC. This step is illustrated in the figure with a block 101.

Delay estimates are collected from the monitored flows, this is added into the measurement matrix. This step is illustrated in the figure with a block 102.

The average is estimated for a time window where the window is set to represent a number of rows back in time in the measurement matrix. For example the time window could be set to 10 seconds; in that case if each row represents measurements done in an interval of one second, 10 rows will be considered. This step is illustrated in the figure with a block 103.

Compare time window average with the base line. This step is illustrated in the figure with a block 104.

If the average for a specific time window is above the baseline the node is considered overloaded. The average value has increased and thus one or possibly several of the VMs experience insufficient resources. This step is illustrated in the figure with a block 105.

Determination of which VM to migrate. This step is illustrated in the figure with a block 106.
  a. One way is to migrate any VM. This will free resources from the physical host which can be utilized by the remaining VMs.
  b. A second way is to find which VM first experienced increased delay which then lead to an increase in resource utilization of the physical node and a subsequent delay for other VMs; this is done by inspecting the measurement matrix. The VM that was found would be migrated to a host with more resources.

Actual migration is done using state-of-the-art methods known to a person skilled in the art. This step is illustrated in the figure with a block 107.

A similar approach can be used for measured jitter. However, for jitter there is no need of a pre-service estimated baseline. Instead, the jitter estimated at the HW NIC is compared to the jitter estimated at the VM NICs. If the average jitter calculated based on the jitter experienced by all the VMs, for a time window is increasing (or is above a predefined SLA) the host is considered overloaded and hence migration can take place.

Figure 7:
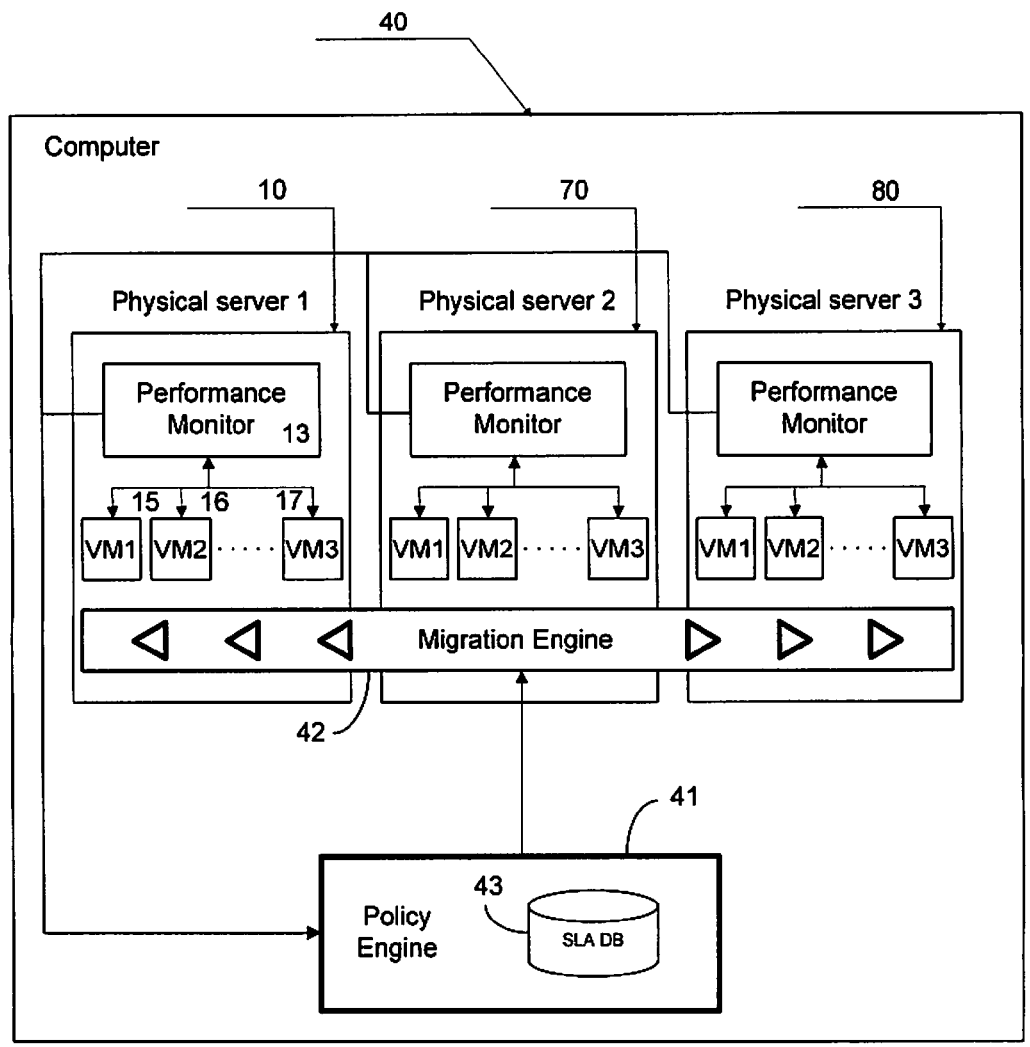
FIG. 7 discloses an example of a computer system comprising several physical servers and a migration engine.

FIG. 7 discloses a computer usage scenario. In FIG. 7 a computer 40 can be seen that comprises three physical servers 10, 70 and 80. The physical server 10 comprising the entities 13, 15, 16 has been explained earlier together with FIG. 2. A similar entity approach is assumed for the entities 70 and 80. A migration engine 42 and a policy engine 41 can be seen in FIG. 7. One of the usages of the performance monitoring described in this invention is to utilize Service Level Agreements SLA between a computer operator and customers. The SLA could outline parameters such as minimum delay or minimum jitter acceptable by the applications run in the computer by the customers. The performance monitoring tool could also serve as the trigger mechanism to the migration of VM running customer applications when the performance parameters drop below a threshold level as defined by the SLA.

The policy engine gets performance monitoring input for the performance monitoring modules embedded across the physical servers in the computer. By comparing the input with the values defined in the SLA, a decision is made if a VM should be moved to another physical server where more resources are available. The movement or migration is done by the migration engine. An example of a migration engine is VMWare's VMotion, see http://www.vmware.com/pdf/vmotion [2010-01-20]. A situation could arise where there is not sufficient resources for the VMs in an existing physical server, in this case the VM could be migrated to another physical server site under the control of the computer operator.

Items are shown in the figures as individual elements. In actual implementations of the invention however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

Individual function blocks are shown in one or more figures. Those skilled in the art will appreciate that functions may be implemented using discrete components or multifunction hardware. Processing functions may be implemented using a programmed microprocessor or general-purpose computer. The invention is in other words not limited to the above described and in the drawings shown embodiments but can be modified within the scope of the enclosed claims.

The invention is of course not limited to the above described and in the drawings shown embodiments but can be modified within the scope of the enclosed claims.

The invention claimed is:

1. A method to monitor performance of a computer comprising at least one physical server where each physical server comprises a hardware machine attached via a hypervisor to a plurality of virtual machines, wherein the method in each physical server comprises:
    measuring server performance parameters for a selected packet flow in transition between the hardware machine and the virtual machines, where the server performance parameters are measured by utilizing time stamps obtained in the hardware machine and the virtual machines for at least one of incoming packets and outgoing packets;
    estimating the measured server performance parameters by observing parameters time stamped at the hardware machine and corresponding parameters time stamped at the virtual machines;
    identifying at least one of the virtual machines as a source of server degradation by establishing degradation of the observed parameters time stamped at the at least one of the virtual machines; and
    wherein each physical server has a physical hardware clock which is used to obtain the time stamps in the hardware machine and the virtual machines.

2. The method to monitor performance according to claim 1, wherein the method further comprises:
    migrating the at least one of the virtual machines to improve resource allocation.

3. The method to monitor performance according to claim 2, wherein the improvement is performed by migration across physical servers of virtual machines contributing to or experiencing resource depletion in the computer.

4. The method to monitor performance according to claim 2, wherein the computer further comprising a Service Level Agreements database, and whereby the improvement is performed in accordance to Service Level Agreements or application requirements obtained from the Service Level Agreements database.

5. The method to monitor performance according to claim 1, wherein the source of server degradation is determined by observing at least one of jitter and delay.

6. The method to monitor performance according to claim 2, wherein a decision to migrate at least one virtual machine comprises:
    estimating a baseline for delay by calculating an average of the delay for the selected packet flow in transition between the hardware machine and the virtual machines;
    estimating for the selected packet flow an average delay value for a specified time window; and,
    triggering a virtual machine migration if average delay value > baseline.

7. The method to monitor performance according to claim 2, wherein a decision to migrate at least one virtual machine comprises:
    estimating for the selected packet flow an average jitter value for a specified time window; and,
    triggering a virtual machine migration if at least one of an average jitter value > a service level agreement value and if the average jitter value for the specified time window is increasing.

8. A computer comprising:
    at least one physical server, where each physical server comprises a hardware machine attached via a hypervisor to a plurality of virtual machines, wherein each physical server further comprises a performance monitor that interfaces with the hardware machine and the plurality of virtual machines, and wherein the performance monitor is configured to:
- measure server performance parameters for a selected packet flow in transition between the hardware machine and the virtual machines, where the server performance parameters are measured by utilizing time stamps obtained in the hardware machine and the virtual machines for at least one of incoming packets and outgoing packets;
- estimate the measured server performance parameters by observing parameters time stamped at the hardware machine and corresponding parameters time stamped at the virtual machines; and,
- identify at least one of the virtual machines as a source of server degradation by establishing degradation of the observed parameters time stamped at the at least one of the virtual machines; and, wherein each physical server further comprises a physical hardware clock which is used to obtain the time stamps in the hardware machine and the virtual machines.

9. The computer according to claim 8, wherein the performance monitor is further configured to:
migrate the at least one of the virtual machines to improve resource allocation.

10. The computer according to claim 9, wherein the improvement is performed by migration across physical servers of virtual machines within the computer which are contributing to or experiencing resource depletion in the computer.

11. The computer according to claim 9, wherein the computer further comprising a Service Level Agreements database, and wherein the improvement is performed in accordance to Service Level Agreements or application requirements obtained from the Service Level Agreements database.

12. The computer according to claim 8, wherein the performance monitor is further configured to determine the source of server degradation by observing at least one of jitter and delay.

13. The computer according to claim 9, wherein the performance monitor is configured to make a decision to migrate at least one virtual machine by:
- estimating a baseline for delay by calculating an average of the delay for the selected packet flow in transition between the hardware machine and the virtual machines;
- estimating for the selected packet flow an average delay value for a specified time window; and,
- triggering a virtual machine migration if average delay value > baseline.

14. The computer according to claim 9, wherein the performance monitor is configured to make a decision to migrate at least one virtual machine by:
- estimating for the selected packet flow an average jitter value for a specified time window; and,
- triggering a virtual machine migration if at least one of an average jitter value > a service level agreement value and if the average jitter value for the specified time window is increasing.

15. The computer according to claim 8, further comprising:
- a Service Level Agreements database interfaced with the performance monitor; and
- a network server interfaced with the hardware machine.

16. A performance monitor in a physical server, wherein the physical server comprises a hardware machine attached via a hypervisor to a plurality of virtual machines, wherein the physical server further comprises a physical hardware clock, wherein the hardware machine comprises a hardware network interface card, wherein each virtual machine comprises a virtual machine network interface card, and wherein the performance monitor comprises:
- a processor; and,
- a memory that stores processor-executable instructions, wherein the processor interfaces with the memory to execute the processor-executable instructions, whereby the performance monitor is operable to:
  - select a packet flow to monitor which is in transition between the hardware machine and the virtual machines;
  - receive time stamps from the hardware network interface card and the virtual network interface card for at least one of incoming packets and outgoing packets associated with the selected packet flow, wherein the time stamps were obtained in the hardware machine and the virtual machines by using the physical hardware clock;
  - estimate server performance parameters by utilizing the obtained time stamps; and,
  - identify at least one of the virtual machines as a source of server degradation by utilizing at least the estimated server performance parameters.

17. The performance monitor according to claim 16, wherein the performance monitor is operable to identify at least one of the virtual machines as a source of server degradation by utilizing at least the estimated performance parameters to observe at least one of jitter and delay.

18. The performance monitor according to claim 16, wherein the performance monitor is operable migrate the at least one virtual machine by:
- estimating a baseline for delay by calculating an average of the delay for the selected packet flow in transition between the hardware machine and the virtual machines;
- estimating for the selected packet flow an average delay value for a specified time window; and,
- triggering a virtual machine migration if average delay value > baseline.

19. The performance monitor according to claim 16, wherein the performance monitor is operable migrate the at least one virtual machine by:
- estimating for the selected packet flow an average jitter value for a specified time window; and,
- triggering a virtual machine migration if at least one of an average jitter value > a service level agreement value and if the average jitter value for the specified time window is increasing.

* * * * *

UNITED STATES PATENT AND TRADEMARK OFFICE
CERTIFICATE OF CORRECTION

PATENT NO. : 9,063,769 B2
APPLICATION NO. : 13/575643
DATED : June 23, 2015
INVENTOR(S) : Damola et al.

Page 1 of 1

It is certified that error appears in the above-identified patent and that said Letters Patent is hereby corrected as shown below:

On The Title Page,

On Page 2, in Item (56), under "OTHER PUBLICATIONS", in Column 2, Lines 14-15, delete "http://www.vmare.com/pdf/vmotion_datasheet.pdf." and insert -- http://www.vmware.com/pdf/vmotion_datasheet.pdf. --, therefor.

In The Specification,

In Column 1, Line 39, delete "Application" and insert -- Applications --, therefor.

In the Claims,

In Column 8, Line 22, Claim 1, delete "and" and insert -- and, --, therefor.

In Column 10, Line 3, Claim 15, delete "and" and insert -- and, --, therefor.

Signed and Sealed this
Fifth Day of January, 2016

Michelle K. Lee
*Director of the United States Patent and Trademark Office*